Oct. 17, 1950     C. R. MYERS ET AL     2,526,149
VEHICLE BRAKE AND AUTOMATIC SELF-ADJUSTING
MEANS THEREFOR

Filed Oct. 18, 1948     3 Sheets-Sheet 1

INVENTORS
C. R. Myers
L. F. Dasse
BY
Robert Cobb
ATTORNEYS

Oct. 17, 1950

C. R. MYERS ET AL 2,526,149

VEHICLE BRAKE AND AUTOMATIC SELF-ADJUSTING
MEANS THEREFOR

Filed Oct. 18, 1948

INVENTOR.
C. R. Myers
L. F. Doane
BY
Robb & Robb
ATTORNEYS

Patented Oct. 17, 1950

2,526,149

UNITED STATES PATENT OFFICE 2,526,149

VEHICLE BRAKE AND AUTOMATIC SELF-ADJUSTING MEANS THEREFOR

Claude R. Myers, Galien, and Lester F. Dasse, Sodus, Mich., assignors, by mesne assignments, to Lambert Brake Corporation, St. Joseph, Mich., a corporation of Michigan Application October 18, 1948, Serial No. 55,178

11 Claims. (Cl. 188—72)

1

The present invention relates to improvements in brakes for vehicles or the like, and it is herein shown, for exemplification purposes, as applicable in particular to the disc type of servo-brake construction embodying a rotatable unit and a relatively stationary braking unit, which latter is composed of complemental discs or rings arranged to be shifted axially to bring them into frictional contact with the rotating unit to produce brake application. To effect this operation energizing or cam means are disposed between the complemental discs, so that upon relative rotary movement of one of the discs the camming means causes separation of the discs to bring their friction surfaces into contact with the coacting friction surfaces of the rotating unit.

In the course of time these friction surfaces wear away, thereby reducing the effectiveness of the brake action. As the wear occurs, the brake pedal changes to a lower position, or the movement of the brake pedal becomes excessive, and in the course of time the floor board of the vehicle interferes with the pedal operation. Usually, adjusting means are provided in these brake constructions which enable the space between the friction surfaces to be normalized from time to time to the proper spacing distance or running clearance. This important adjustment is neglected many times, resulting in accidents, or improper operation of the vehicle, because maintenance of brakes involves too often the human weakness of putting off the corrective attention which should be paid to brake mechanism.

The object of this invention, succinctly stated, is to provide an automatic, self-adjusting means by which a constant and predetermined running clearance is maintained between the linings and the opposing friction surfaces of the braking members throughout the life of the same.

In carrying out the invention, we employ what may be termed a locking clutch, comprising a rod member which is connected at one end to one of the complemental brake discs that is capable of slight rotary movement relative to the other, while the other end of said rod cooperates with a one-way acting gripping or locking member mounted on the other disc, thus at all times allowing take-up movement of the rod and axial movement of the disc connected thereto as the wear on the friction faces occurs incident to brake application, while preventing movement of the rod in the opposite direction when the brake is released.

The result of this automatic self-adjustment is to change the position of the discs relative to

2 their opposing friction surfaces so as to compensate for the wear of the linings and to maintain a constant clearance of the braking elements.

The advantages of the invention due to this automatic adjustment are numerous but at least, from the standpoint of operative maintenance, an important feature resides in the fact that the arrangement will maintain the same pedal height for the life of the brake without mechanical adjustment of the pedal or any attention on the part of the vehicle operator.

Other and further objects and advantages of the invention will be hereinafter set forth and the novel features thereof defined by the appended claims.

Figure 3:
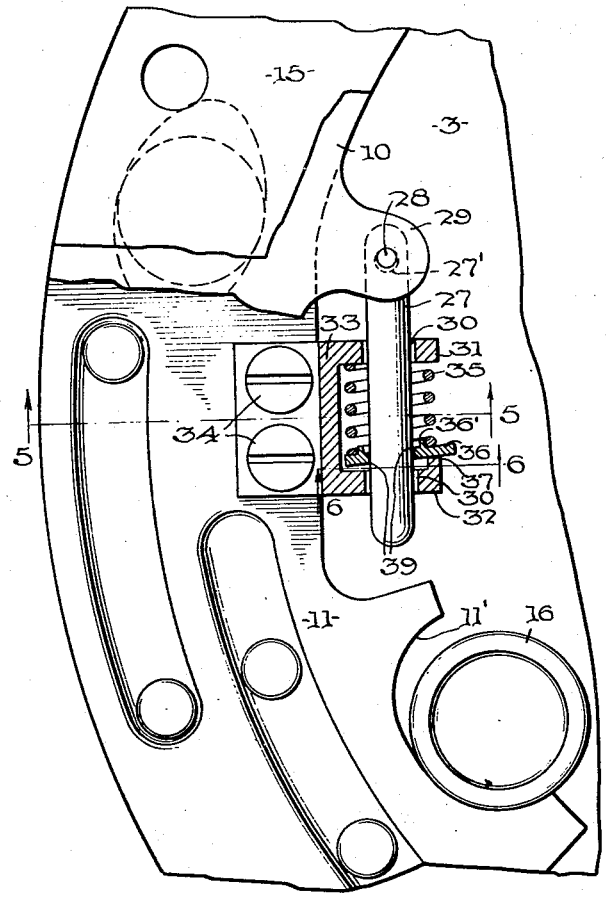
Figure 3 is a fragmentary, enlarged detail view of one of these clutch units showing certain parts in section.
Figure 4:
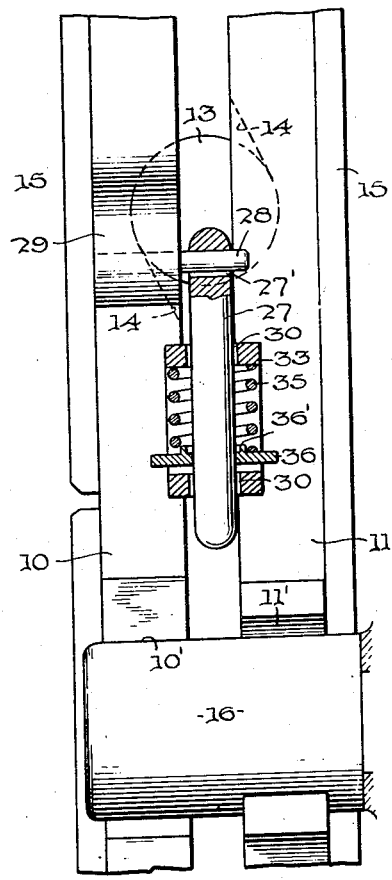
Figure 5:
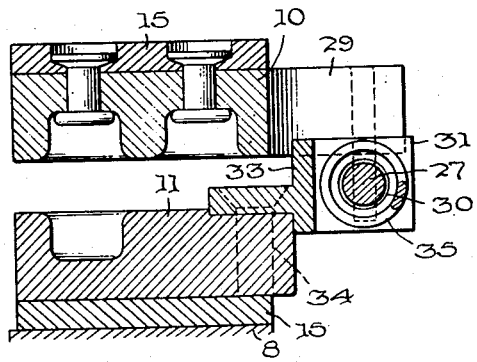
Figure 6:
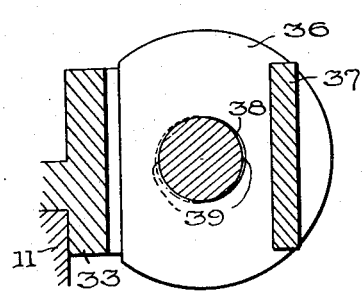

Figure 4 is an enlarged view at right angles to that of Figure 3 showing certain parts in section; and Figures 5 and 6 are sectional views taken on the lines 5—5 and 6—6, respectively, of Figure 3.

Figure 1:
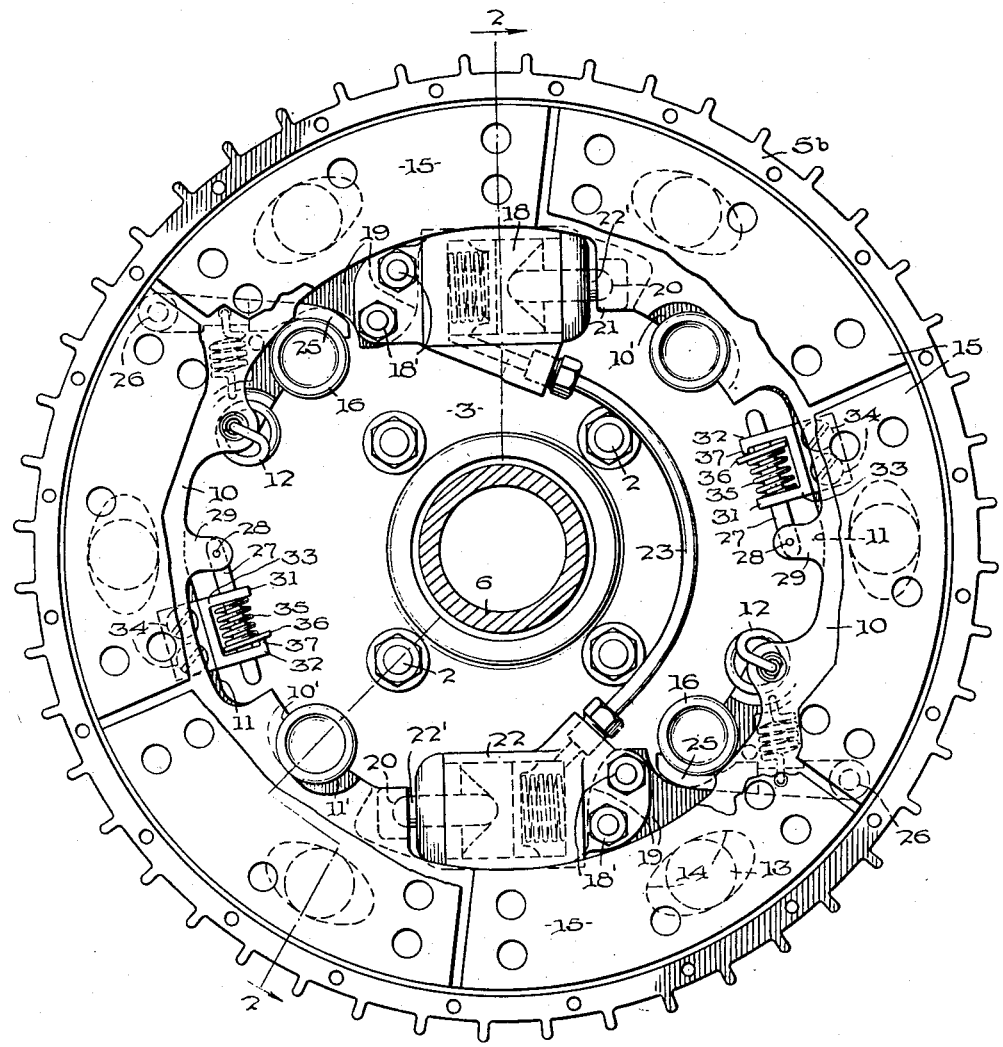
Figure 1 is a front elevation of the brake invention with the cover plate of the casing removed.
Figure 2:
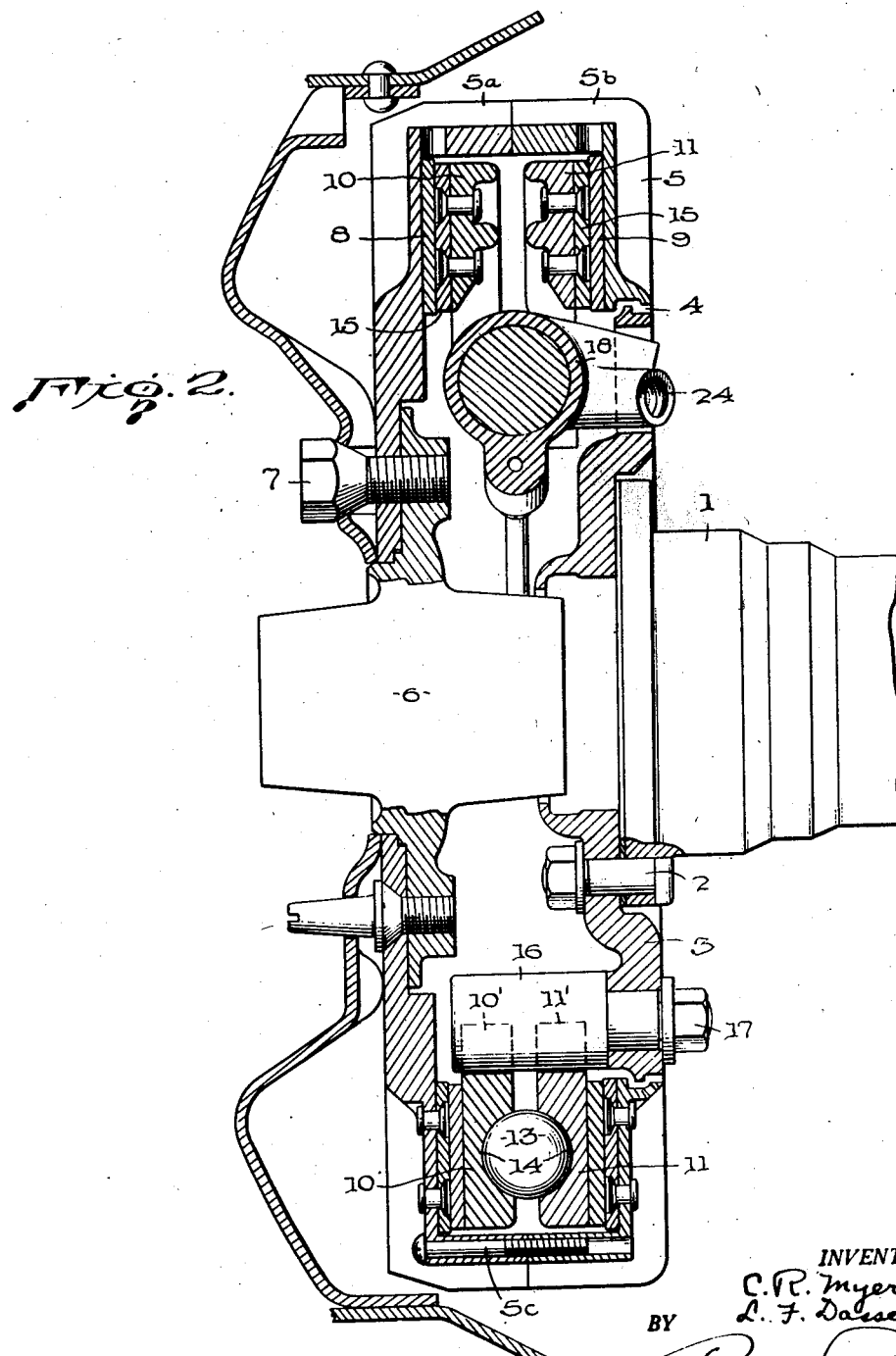
Figure 2 is a vertical section on the line 2—2 of Figure 1.

Referring to Figures 1 and 2, we have shown our invention applied to a disc type of brake construction, a double disc hydraulic servo-brake for automotive vehicles, such as used upon the rear wheels of the same, but it is to be understood that our invention may readily be adapted to other brake devices, and therefore the invention is not to be restricted to the specific form illustrated herein.

The reference numeral 1 designates the axle housing to which is bolted, as at 2, the supporting flange plate 3 which is disposed in the opening 4 of the rotatable casing 5. This casing is fastened to the wheel hub flange 6 by bolts 7.

The casing 5 is composed of the complemental flanged discs 5a and 5b secured together by the screws 5c, the first of these discs having the internal friction surface 8, and the second the friction surface 9. Within the casing is mounted the relatively stationary braking unit assembly hereinafter described.

This inner braking unit is composed of twin discs or rings 10 and 11 arranged back-to-back and connected together by opposing springs 12, but held in spaced relation to each other by a series of balls 13 that are seated in cam pockets or half pockets 14. As will be seen in Figures 1 and 3, these pockets are arcuately formed, and arranged in opposing pairs, the metal of the discs in which the pockets are formed being suitably hardened to withstand the pressures imposed on the camming surfaces. As shown in Figure 4, each pocket is deeper at one end and conforms with the surface of the coacting steel ball. Then the surface inclines upwardly or outwardly to the surface of the disc, one in opposite direction to the other of each pair. Thus, upon relative movement of said discs rotatively, said discs will separate until the faces of the brake lining 15, 15 come into frictional contact with the respective surfaces 8 and 9 of the casing to initiate braking action followed by further braking operation or servo-action.

The braking unit assembly is slidably mounted upon hollow studs 16 secured to the flange plate 3 by the nuts 17. It will be observed by reference to Figures 1 to 3 of the drawings that each of the actuator discs 10 and 11 is formed about its inner periphery with elongated cut-outs or notches, terminating in arcuate seats 10' and 11' respectively, engaging on opposite sides of the coacting lug. The notches are sufficiently long to permit the discs to rotate slightly when brake application occurs, thus permitting the camming of the discs apart from each other and engagement of the friction surfaces as above described. Obviously, rotary movement is stopped in one direction so far as one of these discs is concerned, and is stopped in the other direction of rotation so far as the other disc is concerned, speaking with reference to any brake application during movement of the vehicle in opposite directions. However, when the vehicle is reversed, this freedom of rotary movement of the respective discs is reversed from that just described. The opposite end of each cut-out in each disc constitutes a relief, permitting shifting of the discs independently of each other.

The relative rotation of the discs for bringing them into contact with the surfaces 8 and 9, when servo action takes place to continue the rotation, in the exemplification herein shown, is produced by the hydraulic cylinders and pistons shown in Figure 1 as mounted on the braking unit. The upper cylinder 18 is fixedly connected to the lug 19 of the disc 11 by bolts 18', and its plunger 22', at its outer end, is seated in a socket 20 formed in the lug 21 on the opposing disc 10.

The lower cylinder 22 is connected to the discs in the same manner and needs no further description other than that both cylinders are connected by the fluid pressure pipe 23. The fluid pressure medium is passed into the nipple 24 by the usual hydraulic system when the vehicle is to be braked, which causes the initial rotary movement of the disc which is free to turn. When the brake is released, the tensioned springs 12 quickly return the discs to normal position. To prevent the brake unit from rattling in this arrangement, we employ diametrically disposed spring tensioned fingers 25 pivotally secured to one of the discs, as at 26, while the free end of said fingers bears against the adjacent stud 16.

Referring now to Figures 3 and 4 and to the primary feature of this invention, the automatic brake adjuster mechanism comprises the adjustment rod 27 which is connected to the anchor pin 28 pressed into a lug 29 of the outer actuating disc 10. This rod extends freely through openings 30 in the spaced ears 31, 32 of the guide bracket 33 rigidly secured to the inner actuating disc 11 by means of the screws 34. Between the ears and surrounding the rod is a compression spring 35, the lower end of which is seated on a washer-like lock member or clutch 36 shown more clearly in Figures 3, 4 and 6. The upper face of this lock element is formed with an upstanding flange 36' around which one end of the spring 35 is seated. The lock washer element is pressed firmly at one side against an upstanding ledge 37 on the lower ear 32 of the guide bracket. The lower end of the rod 27 passes through the washer opening 38 which is of larger diameter than the rod, and the washer thus normally assumes a canted position, as shown in Figure 3, in which the edge of the washer opening, at 39, bites into the metal of the rod 27, thereby preventing longitudinal movement of the rod in a downward direction.

The rod may thus move only in one direction, namely, upwards, as when pulled upwardly by rotary movement of the outer disc 10. The friction between the bolt and the lock washer will raise the latter to a substantially horizontal position, relieving the biting engagement described above, and resulting in a take-up of the rod and adjustment of running clearance between the discs 10 and 11 to normal. It is important to note that this running clearance is controlled by the clearance allowed between the opening 27' at the top of the rod and the anchor pin 28. The openings in the bracket ears are large enough to allow the rod 27 to move in a slight arc caused by relative rotation of the discs 10 and 11. No movement of the adjustment rod 27 takes place until appreciable wear of the friction surfaces of the brake occurs.

Whenever it is necessary to replace the friction linings, the locking action of the washer must be released by inserting a suitable tool beneath the lower side of said washer to raise the same against the tension of the spring, thereby allowing the rod 27 to move in a downward direction through the bracket openings.

It is desirable in this type of brake construction to use two such brake adjusters and to arrange them in diametrical relation, as shown clearly in Figure 1, to obtain counterbalanced tensions.

The operation of this brake construction will be obvious from the above description and therefore a general summary only will be made. When the brake is applied, a relative rotary movement of the actuator discs 10 and 11 of the braking unit is caused by operation of the brake pedal (not shown) and the hydraulic cylinder plungers. Immediately, the balls 13 are caused to ride up the camming surfaces of the pockets 14, thereby causing the discs to separate and move axially into contact with the friction surfaces of the rotatable casing 5, said discs then picking up further rotary motion from said casing until the latter is braked to a stop. When pedal pressure is released, the discs resume their initial position and the balls return to the deep portion of the pockets, assuming there is no appreciable wear. As the braking surfaces wear, the discs 10 and 11 must revolve further to effect braking action, and thus the rods 27 of the adjuster devices are pulled through the guide brackets and the locking washers 36. When the brake is released as stated, the rods 27 are locked against reverse movement in the brackets and the discs 10 and 11 are held to the predetermined limit by the clearance between the opening in each rod 27 and its anchor pin. A very effective braking action is thus provided at all times and is maintained through the life of the brake linings used.

While the specific details of construction have been herein shown and described, the invention is not confined thereto as changes and alterations may be made without departing from the spirit thereof as defined by the appended claims.

We claim:

1. Brake mechanism for vehicles and the like, comprising in combination, a rotatable member to be braked having opposed friction surfaces, a braking unit cooperating with said member and composed of a pair of axially movable discs having friction surfaces cooperative with the friction surfaces of the rotatable member, one of said discs being slightly rotatable relative to the other, a support for said braking unit, camming means between the discs for effecting separation of the discs to bring their friction surfaces into contact with the said rotatable member, means for imparting slight rotary movement to one of said discs to initiate braking action, and a brake adjuster device for adjusting the running clearance between the braking surfaces whenever appreciable wear occurs, said adjuster device having a part connected to one of the braking unit discs and a lock member carried by the other disc for holding said part in the take-up position and the friction surfaces spaced to normal distance throughout the use of the brakes.

2. Brake mechanism as set forth in claim 1, wherein the connection of the said part of the adjuster device to the braking unit disc has a clearance space corresponding to the normal clearance space between the opposing friction surfaces of the braking unit and the rotatable member to be braked.

3. Brake mechanism as set forth in claim 1, wherein the lock member comprises a canted washer which engages the part connected to the braking unit disc so as to permit movement of said part only in one direction for effecting adjustment of the normal clearance space between the friction surfaces to take up wear on said surfaces.

4. Brake mechanism for vehicles and the like, comprising a braking unit for cooperation with a part to be braked and comprising a pair of actuator discs yieldably connected together and axially and rotatably shiftable relative to each other, camming means between said discs, means operable to effect slight rotary movement of one of said discs and axial movement of said discs responsive to operation of said camming means, supporting means for said unit, a brake adjuster device carried by said braking unit and including an adjustment rod connected to one of the discs of the braking unit, said connection having a predetermined clearance, a guide bracket connected to the other disc of said braking unit having an opening through which the rod extends, and means on said bracket normally clutching the rod to hold it against movement in one direction while permitting movement in the other direction upon slight rotary movement of the disc to which the rod is connected, whereby to take up wear.

5. Braking mechanism as set forth in claim 4, wherein the supporting means for the braking unit includes spaced supports with which the discs cooperate to permit slight rotary movement of one of said discs while preventing movement of the other during braking operation, and the adjustment rod connection comprises an anchor pin extending loosely through an opening in the rod with a predetermined clearance for controlling the running clearance between the braking unit and the part to be braked, and wherein the clutching means comprises a washer member through which the adjustment rod extends and is bitingly engaged with said rod.

6. Brake mechanism for vehicles and the like, comprising a pair of rotatable members connected to a part to be braked, each of said members having an annular friction surface, a braking unit disposed between said members and composed of a pair of annular discs having friction surfaces spaced a predetermined distance from those of said rotatable members, means for supporting said braking unit so as to permit relative movement of its discs axially and rotatably relative to each other, means for effecting the relative rotary movement of the discs, camming means for effecting said axial movement of the discs upon relative rotary movement of said discs to produce braking action, and means disposed adjacent to the inner periphery of said discs for automatically maintaining the predetermined distance between the parts as aforesaid throughout use of the brake mechanism.

7. Brake mechanism as set forth in claim 6, wherein the automatic means comprises a guide bracket fixedly secured to one of the braking unit discs and having an opening therein and an upstanding ledge adjacent to said opening, an adjustment rod extending through said opening and having one end connected to the other of said discs by an anchor pin extending through an opening at the end of the rod with a clearance corresponding to the predetermined distance between friction surfaces of the brake parts aforesaid, and a washer member mounted around the rod and seated at one side on the bracket ledge so as to be disposed in a canted position and bitingly engaging the said rod, said washer member permitting take-up action of the rod to compensate for wear on the brake frictional surfaces while preventing movement of the rod when the brake is released.

8. Brake mechanism for vehicles and the like, comprising a casing adapted to be connected to the part to be braked and having internal opposed braking surfaces, a braking unit in said casing, supporting means extending into said casing on which the braking unit is slidably disposed, said unit comprising a pair of relatively slidable and rotative discs, yieldable means connecting the discs together, means between the discs for expanding the same into frictional engagement with braking surfaces of the casing, means for imparting relative rotary movement to said discs to initiate braking operation, and a brake adjuster device for taking up frictional wear as the same occurs, comprising an adjustment rod, an anchor pin carried by one of the discs and extending loosely through an opening in one end of the rod, a bracket secured to the other disc and having spaced apertured ears through which the other end of the rod extends, spring means between the ears and surrounding the rod, and a locking means coacting with one of said ears and tensioned by said spring into engagement with the rod, whereby the rod is free to move in one direction to compensate for brake wear and held against movement in the opposite direction.

9. Brake mechanism as defined in claim 6, wherein said braking unit, together with the means for effecting relative rotary movement of the discs and the means for automatically maintaining the predetermined distance between the discs and the rotatable members connected to the part to be braked, are slidably mounted on said supporting means and are bodily displaceable as a composite unit from the supporting means and from between the rotatable members.

10. A friction device for brakes and the like, comprising a pair of coaxial annular disc members, camming means between said disc members for axially moving said disc members toward and away from each other responsive to rotative movement of one disc member relative to the other in opposite directions, yieldable means interconnecting said disc members for normally urging said disc members towards each other, and means operatively connected to the respective disc members for permitting free relative rotative movement of said disc members in one direction, while limiting relative rotative movement of said disc members in the opposite direction.

11. A friction device for brakes and the like, comprising a pair of coaxial annular disc members, camming means between said disc members for axially moving said disc members toward and away from each other responsive to rotative movement of one disc member relative to the other in opposite directions, yieldable means interconnecting said disc members for normally urging said disc members towards each other, and one-way adjuster means operatively connected to the respective disc members for permitting free relative rotative movement of said disc members in one direction, while limiting relative rotative movement of said disc members in the opposite direction.

CLAUDE R. MYERS.
LESTER F. DASSE.

REFERENCES CITED

The following references are of record in the file of this patent:

UNITED STATES PATENTS

| Number | Name | Date |
| --- | --- | --- |
| 2,278,144 | Milan | Mar. 31, 1942 |
| 2,355,720 | Forbes | Aug. 15, 1944 |

FOREIGN PATENTS

| Number | Country | Date |
| --- | --- | --- |
| 232,251 | Switzerland | May 15, 1944 |
| 464,130 | Great Britain | Apr. 6, 1937 |